I. COULOMBE.
LET-OFF MOTION FOR LOOMS.
APPLICATION FILED FEB. 8, 1913.
1,062,443.
Patented May 20, 1913.
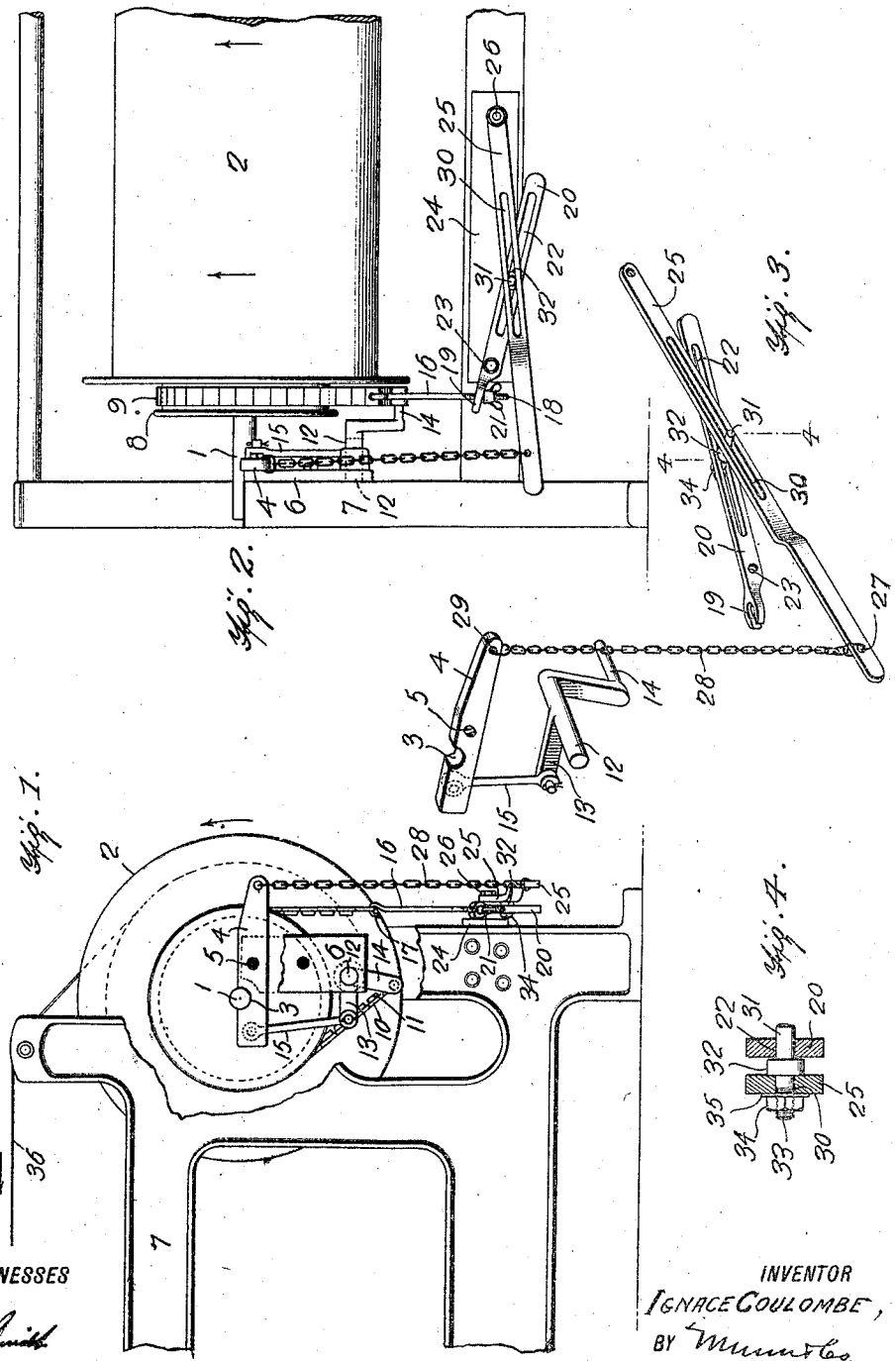
WITNESSES
INVENTOR
IGNACE COULOMBE,
BY
ATTORNEYS

UNITED STATES PATENT OFFICE.

IGNACE COULOMBE, OF FALL RIVER, MASSACHUSETTS.

LET-OFF MOTION FOR LOOMS.

1,062,443.   Specification of Letters Patent.   Patented May 20, 1913.

Application filed February 8, 1913. Serial No. 747,099.

*To all whom it may concern:*

Be it known that I, IGNACE COULOMBE, a citizen of the United States, and a resident of Fall River, in the county of Bristol and State of Massachusetts, have invented a new and useful Improvement in Let-Off Motions for Looms, of which the following is a specification.

My invention is an improvement in let-off motions for looms, and has for its object the provision of a device of the character specified, wherein the tension on the warp beam is controlled by the weight of the yarn on the beam, and wherein the arrangement is such that the said weight acts upon both ends of the brake band to tighten the same to regulate the tension thereof.

In the drawings:—Figure 1 is an end view of a portion of the loom provided with the improved let-off motion, a part of the loom frame being broken away, Fig. 2 is a front view of the same, Fig. 3 is a perspective view of the support for the beam, and Fig. 4 is a section on the line 4—4 of Fig. 3.

In the present embodiment of the invention, the spindle 1 of the warp beam 2 rests in a bearing recess 3, near one end of a bearing lever 4, pivoted intermediate its ends as indicated at 5 to a bracket 6, supported on the frame 7 of the loom. The bearing recess 3 for the spindle is adjacent to the pivotal support 5 of the lever, and a brake disk 8 is at the end of the beam adjacent to the said lever. The brake band or chain 9 may be of any desired construction, as for instance, composed of links 10, each having an insert 11 of cork or the like, the inner faces of the inserts engaging the periphery of the brake disk.

An elbow lever consisting of a spindle 12 and arms 13 and 14 is journaled on the bracket 6, before mentioned, the spindle 12 being journaled in an opening in the bracket. One end of the brake chain 9 is connected with the arm 14 and a link 15 connects the other arm 13 with the end of the lever 4 adjacent to the spindle bearing. The other end of the brake band or chain has connected thereto one end of a rod 16, the said rod having a hook 17 for engaging the end of the band or chain and the opposite end of the rod is threaded as indicated at 18, and passes through an opening 19 in one end of a lever 20, and a wing nut 21 is threaded on to the rod below the lever. The lever 20 is longitudinally slotted, as indicated at 22, and the said lever is pivoted at 23 to a plate 24, supported on the frame of the loom. A second lever 25 is pivoted at 26 to the said plate, and the opposite end of the lever 25 is provided with an opening 27, in which is engaged one end of a chain 28, the other end of the chain being engaged with an opening 29 in that end of the lever 4 remote from the spindle of the warp beam. The lever 25 is also longitudinally slotted as indicated at 30.

It will be noted from an inspection of Figs. 2 and 3 that the lever 20 is pivoted to the plate 24 at the end adjacent to the brake band, while the lever 25 is pivoted at the end remote from the brake band, and the levers are arranged alongside each other, so that the slots 22 and 30 cross each other as shown. A headless bolt 31 is provided for pivotally connecting the levers, the said bolt having an annular rib 32 intermediate its ends, and one end of the bolt is threaded as indicated at 31, and is engaged by a nut 34, a washer 35 being arranged between the nut and the lever 25. The rib 32 is as before stated, arranged between the levers, so that each end of the bolt engages a slot 22 or 30 and the bolt may be clamped to the lever 25 by means of the nut 34. The bolt may be adjusted in the slots to vary the leverage exerted, by loosening the nut 34 and shifting the bolt. It will be noticed that the lever 25 is offset laterally at the end adjacent to the chain 28 in order to prevent interference with the wing nut 21 and the lever 20.

In operation, the tension upon the brake band or chain 9 is adjusted by means of the bolt 31, and when the proper tension is obtained, the device is ready for operation. It is obvious that as the warp 36 passes off the warp beam, the beam will become lighter, and it will be also obvious that the beam must move faster to supply the proper amount of yarn, since the entire diameter of the beam and the yarn thereof decreases. The weight of the beam and the yarn is supported by the inner end of the lever 4, and the said weight tends to swing the elbow lever 12, 13, 14 in a direction to tighten the brake band on the brake disk. The weight of the beam tends to swing the outer end of the lever 4 upward to raise the free end of the lever 25, and to raise that end of the lever 20 remote from the rod 16, whereby to pull the said rod downward to make tension on the other end of the brake band or chain. In other words the greater the weight of the beam and the yarn thereon the greater will be the tension on the brake band and the said tension is exerted at both ends of the band instead of at one end so that the said tension is uniform throughout that portion of the length of the band that contacts with the periphery of the brake disk. As the beam yields, the weight on the lever 4 relaxes, and the said lever tends to swing in such a manner as to relax the tension on both ends of the brake band.

It will be noted that the opening in the extension 19 of the lever 20 through which the threaded end of the rod 16 passes is slotted, the opening being in fact a recess to permit the removal of the rod 16, to release the warp beam without unthreading the rod.

I claim:—

1. The combination with the loom and the warp beam having a brake wheel at one end, of a lever pivoted intermediate its ends to the frame of the loom and having a bearing recess at the inner side of the pivot for receiving the adjacent spindle of the warp beam, an elbow lever pivoted to the frame below the lever, a link connecting one of the arms of the elbow lever with the inner end of the bearing lever, a brake band encircling the wheel and having one of its ends connected with the other arm of the elbow lever, a rod connected at one end with the other end of the band and having its other end threaded, a lever pivoted to the frame of the loom near one end and having an opening at the end adjacent to the pivot for receiving the rod, a nut threaded on to the rod below the lever, a second lever arranged adjacent to the first-named lever and pivoted to the loom frame at the end remote from the brake wheel, a chain connecting the free end of the last-named lever to the bearing lever at the opposite end from the bearing recess, each of the said levers having a longitudinal slot, a headless bolt engaging the slots of the two levers and having an annular rib between the levers, the outer end of the bolt being threaded, and a nut engaging the said end for clamping the bolt to the lever.

2. The combination with the loom and the warp beam having a brake wheel at one end, of a lever pivoted intermediate its ends to the frame of the loom and having a bearing recess at the inner side of the pivot for receiving the adjacent spindle of the warp beam, an elbow lever pivoted to the frame below the lever, a link connecting one of the arms of the elbow lever with the inner end of the bearing lever, a brake band encircling the wheel and having one of its ends connected with the other arm of the elbow lever, a rod connected at one end with the other end of the band and having its other end threaded, oppositely arranged levers pivoted to the frame and extending alongside each other, a pivotal connection between the levers intermediate their ends, said connection being adjustable with respect to the levers, one of the levers being extended beyond its pivot and having an opening in the extension for receiving the rod, a nut threaded on to the rod and a connection between the outer end of the bearing lever and the free end of the other of the last-named levers.

3. The combination with the loom and the warp beam thereof, of a lever pivoted intermediate its ends to the loom and having a bearing recess at the inner side of the pivot for receiving the adjacent spindle of the warp beam, a brake chain or band engaging the beam, an elbow lever pivoted to the loom, a link connecting one of the arms of the elbow lever with the inner end of the bearing lever, the other arm of the elbow lever being connected to one end of the brake band, a pair of levers arranged alongside each other and pivoted at opposite ends to the loom, one of the levers being extended beyond its pivotal connection and having an adjustable connection with the other end of the brake band, a pivotal connection between the levers intermediate their ends, said connection being adjustable with respect to the levers, and a connection between the outer end of the bearing lever and the free end of the other lever of the pair.

4. The combination with the loom and the warp beam thereof, of a bearing lever for the beam, said lever being pivoted to the frame intermediate its ends, a brake chain or band engaging the beam, an elbow lever pivoted to the loom and having one of its arms connected to one end of the band, a connection between the other arm and the end of the bearing lever adjacent to the beam, a pair of levers arranged alongside each other, said levers being pivoted to the loom frame at their opposite ends, a connection between the free end of one lever and the end of the bearing lever remote from the beam, an adjustable pivotal connection between the lever intermediate their ends, the other lever being extended beyond its pivot at one end, and an adjustable connection between the extended end and the other end of the brake chain.

5. The combination with the loom and the warp beam, of a lever pivoted intermediate its ends to the loom, the beam resting on the lever on one side of the pivotal connection, a brake band for the beam, a connection between one end of the bearing lever and one end of the band for tightening the said band when the lever end is pressed downward by the weight of the beam, levers pivoted at one end to the loom, said levers being oppositely arranged and lying alongside each other, a pivotal connection between the levers intermediate their ends, said connection being adjustable with respect to the levers, a connection between the free end of one lever and the other end of the bearing lever, the other lever being extended beyond its pivot, and an adjustable connection between the extension of the lever and the other end of the brake band.

6. The combination with the loom and the warp beam, of a lever pivoted intermediate its ends to the loom, the beam resting on the lever on one side of the pivotal connection, a brake band for the beam, a connection between one end of the bearing lever and one end of the band for tightening the said band when the lever end is pressed downward by the weight of the beam, and a connection between the other end of the bearing lever and the other end of the brake band for making tension on the said end of the brake band when the said other end of the bearing lever moves upward.

7. The combination with the loom and the warp beam, of a lever pivoted intermediate its ends to the loom, and supporting the adjacent end of the warp beam on one side of its pivotal connection, a brake band for the beam, a connection between one end of the bearing lever and one end of the band for making tension on the said end of the band when the said lever end is pressed downward by the weight of the warp beam, a connection between the other end of the bearing lever and the other end of the brake band for making tension on the said end of the brake band when the said lever end moves upward, said connection being adjustable to vary the tension exerted.

8. The combination with the loom and the warp beam having a brake wheel at one end thereof and the brake band passing over the wheel, of a lever pivoted intermediate its ends to the loom, and having a support for the adjacent end of the warp beam on one side of its pivotal connection, and a connection between each end of the lever and the adjacent end of the brake band for making tension on both ends of the band in accordance with the weight of the beam.

IGNACE COULOMBE.

Witnesses:
ERNEST LEVASSEUR,
HENRI ST. ONGE.